United States Patent [19]
Ligon, Sr. et al.

[11] Patent Number: 5,518,294
[45] Date of Patent: May 21, 1996

[54] VARIABLE APEX BACK SUPPORT

[75] Inventors: James T. Ligon, Sr., Almont; Stephen P. Porter, Imlay City; Andrew L. Patrias, Jr., Attica, all of Mich.

[73] Assignee: Ligon Brothers Manufacturing Company, Almont, Mich.

[21] Appl. No.: 247,829

[22] Filed: May 23, 1994

Related U.S. Application Data

[63] Continuation-in-part of Ser. No. 42,926, Apr. 5, 1993, abandoned.

[51] Int. Cl.⁶ ..................................................... A47C 7/46
[52] U.S. Cl. .............................................. 297/284.4
[58] Field of Search ........................................ 297/284.4

[56] References Cited

U.S. PATENT DOCUMENTS

| | | | |
|---|---|---|---|
| 3,762,769 | 10/1973 | Poschl | 297/284.4 |
| 4,153,293 | 5/1979 | Sheldon | 297/284.4 |
| 4,316,631 | 2/1982 | Lenz et al. | 297/284.4 |
| 4,601,514 | 7/1986 | Meiller | 297/284.4 |
| 4,880,271 | 11/1989 | Graves | 297/284.4 |
| 5,197,780 | 3/1993 | Coughlin | 297/284.4 X |
| 5,217,278 | 6/1993 | Harrison et al. | 297/284.4 X |

*Primary Examiner*—Peter R. Brown
*Attorney, Agent, or Firm*—Dykema Gossett

[57] ABSTRACT

A single-piece strong, flexible back support for use in seats such as automobile seats or office chairs, includes a central body portion with outwardly extending support fingers such that an arch having a variable apex is formed when the back support is subtended longitudinally. The longitudinal location of an apex and the shape of the arch formed on the back support changes responsively to a load imposed by a person's back. The inventive back support is capable of taking a variety of shapes thereby providing maximum comfort and support regardless of the user's spinal curvature or posture and position relative to the back support.

20 Claims, 7 Drawing Sheets

VARIABLE APEX BACK SUPPORT

This is a continuation-in-part of application Ser. No. 08/042,926 filed on Apr. 5, 1993, now abandoned.

BACKGROUND OF THE INVENTION

The present invention relates to back supports and more particularly to back supports used in seatbacks.

A variety of seatback back support devices provide added support and comfort to a person's back. These devices are especially common in vehicle seats or office chairs as lumbar supports.

Typically, back supports include several drawbacks and limitations. First, most commonly used mechanical back supports are composed of a relatively large number of parts. Typically, a number of horizontal supporting members are riveted to a pair of vertical supports. Further, a central tension bar is connected to the horizontal members. Such supports are subtended longitudinally to form an arch of varying degree by adjusting the tension bar. A complicated gearing mechanism is needed to adjust the tension bar. A significant drawback is presented by the difficulty associated with assembling such back support systems.

Second, typical back supports are relatively heavy and add undesirable weight to automotive vehicles, thereby limiting the availability of such supports.

Third, such supports are rigid and, therefore, typically require a complex spring mounting system within the seatback to provide comfort to a person using the support. Such spring mounting systems are relatively complicated and expensive to manufacture. Such spring mounting systems also increase the weight of the seat.

Fourth, typical back supports form a single apex within the supporting arch. The apex preferably should be at varying locations within the seatback to provide support to a variety of people. Therefore, complicated mounting and gearing mechanisms are needed to adjust the position of the support apex relative to the seat. Such mounting and gearing mechanisms are subject to breakdown and further add undesirable weight to the seat.

All the above-described limitations and drawbacks are undesirable. Therefore, an object of the present invention is to provide a flexible, strong back support that simplifies manufacture and assembly of back supports and, correspondingly, vehicle seats or chairs. Another object of the present invention is to provide a back support that has an automatically adjusting apex that effectively moves along the longitudinal length of the back support. A back support in accordance with the present invention therefore properly conforms to a user's back to provide greater comfort and support.

SUMMARY OF THE INVENTION

In its most general terms, this invention provides a unitary flexible support member formed from a single sheet of material. The support member preferably has a central body portion with a longitudinal axis and opposite ends at each end of the axis. A number of support fingers extend outwardly from the central body portion in a generally horizontal direction. Lastly, a means for arching the support member is attached to the support member to arch the support member outwardly to support a person's back.

When an arch is formed on the back support, a person receives comfortable support for their back. The apex of the arch effectively moves longitudinally along the length of the support to conform to the shape of the user's back and to provide maximum support wherever that is most needed.

These and other features and objects of the present invention will become apparent to a person skilled in the art from the following detailed description and the appended drawings.

DETAILED DESCRIPTION OF THE PREFERRED EMBODIMENT

Figures 1, 6:
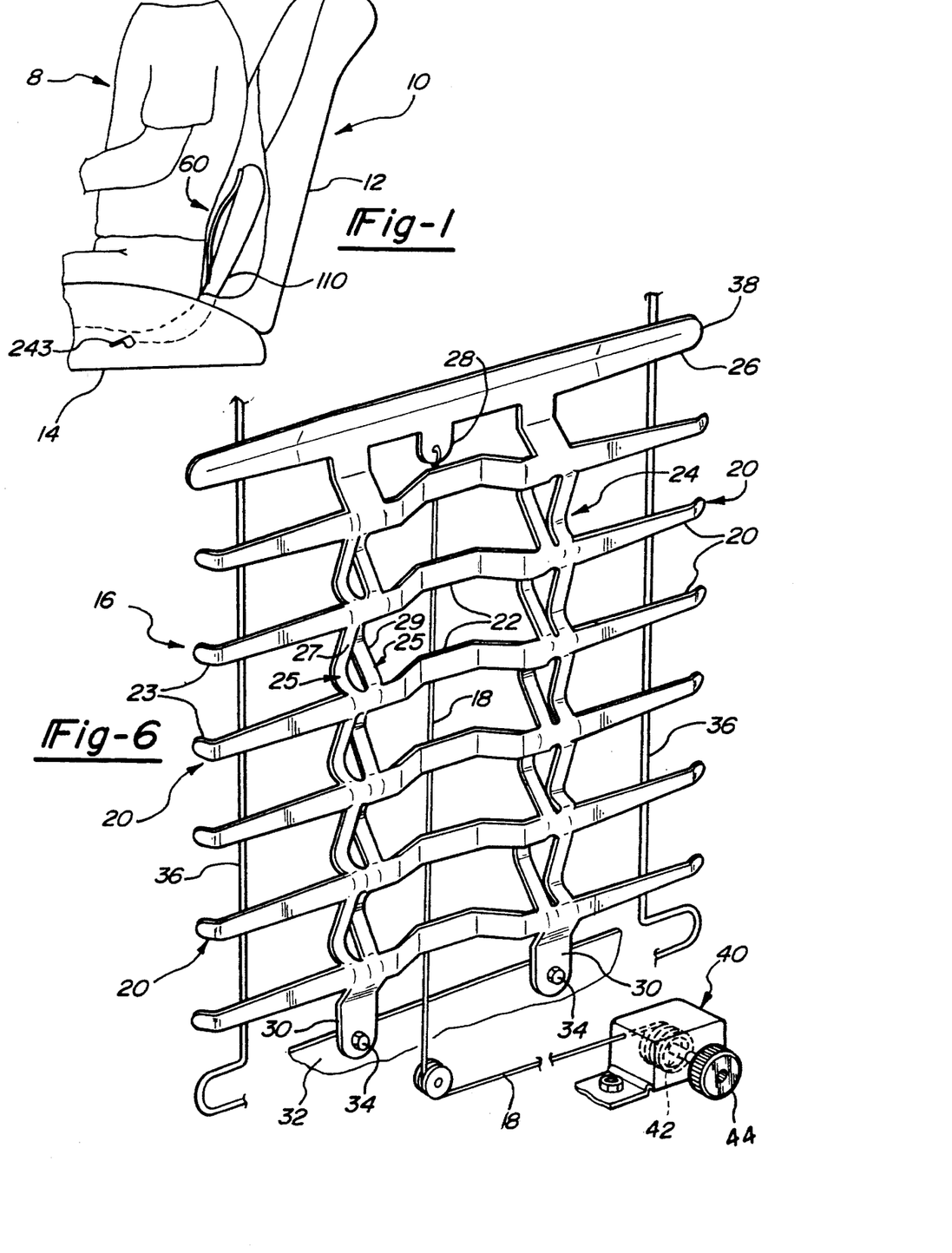
FIG. 1 is a diagramatic representation of a person sitting in a seat including the inventive back support.
FIG. 6 is a perspective view of the inventive back support as it would be attached to a seat frame.

FIG. 1 diagrammatically shows a person 8 sitting on a seat 10 made up, in part, of a seatback 12 with a base 14 pivotally connected to seatback 12. Back support 60 is connected to seatback 12 and tension member 110 is appropriately connected to back support 60.

Figure 2:
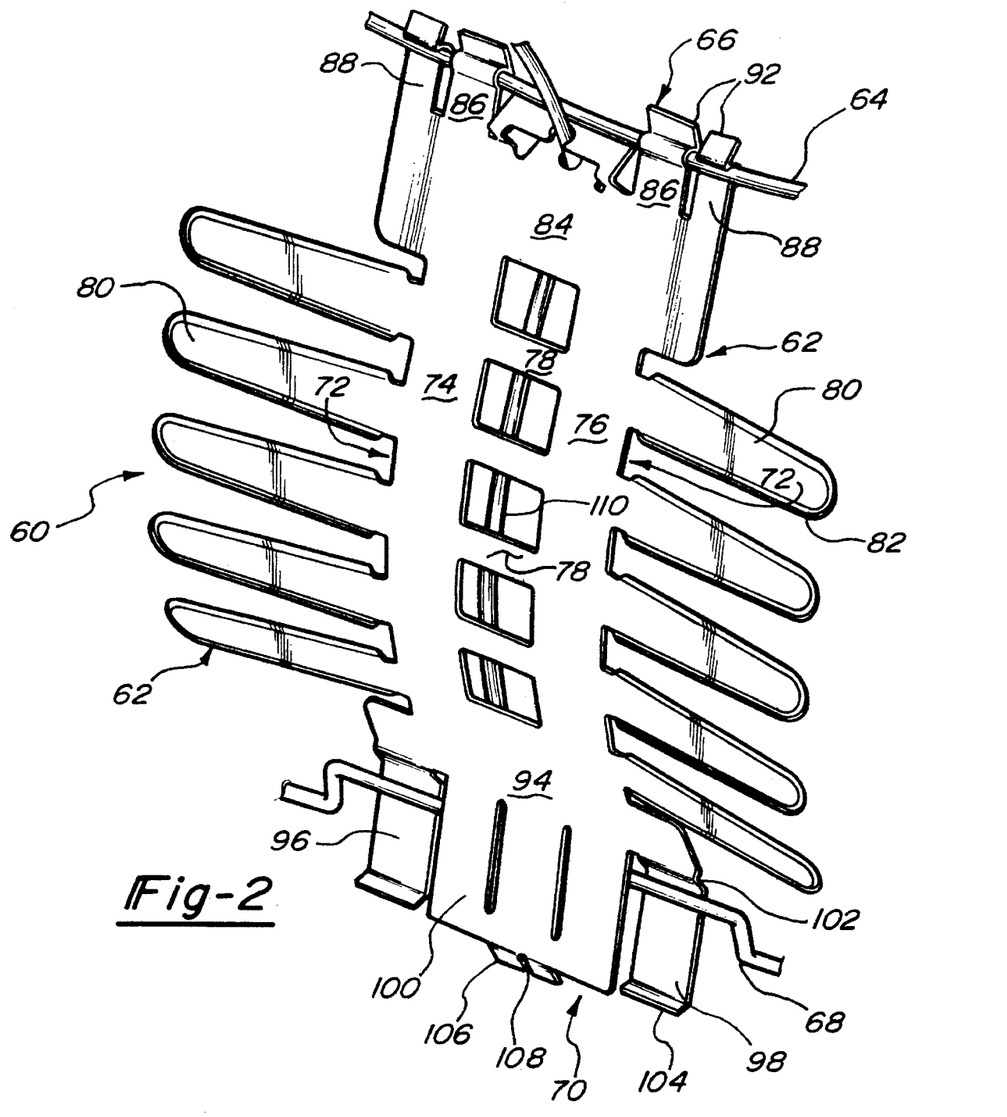
FIG. 2 is a front perspective view of the presently preferred embodiment of the inventive back support.

Referring now to FIGS. 2–5, the presently preferred embodiment of this invention shall be described. FIG. 2 is a front perspective view of the presently preferred embodiment 60 of a back support designed in accordance with this invention. Single-piece support member 62 is mounted in a conventional seatback upon bar 64 at a first longitudinal end 66 of the single-piece support member 62. A bar 68 is positioned near the second longitudinal end 70 of single-piece support member 62 such that the mounting portion near the second longitudinal end 70 provides a pivotal and movable mount upon bar 68. Bars 64 and 68 are preferably horizontally disposed within a seatback frame as generally shown in FIG. 2. The details of the mounting and movement of the single-piece support member 62 upon bars 64 and 68 shall be described in detail below.

Single-piece support member 62 includes central body 72 that further includes longitudinal strips 74 and 76. Transverse strips 78 are provided between longitudinal strips 74 and 76 to provide greater comfort to a user and to provide more integrity and stability to single-piece support member 62. Single-piece support member 62 is preferably formed of a single stamping of an alloy metal known as. Martinsite®. The lightweight and durable nature of single-piece support member 62 is enhanced by providing transverse strips 78 between longitudinal strips 74 and 76 rather than providing a solid member as central body 72.

Extending transversely outward from central body 72 are support fingers 80. As can best be seen in FIG. 5, support fingers 80 are angled in a forward direction relative to a plane defined by central body 72. The angle of support fingers 80 is provided to yield greater lateral support for a user and to enhance the comfort provided by the inventive back support. The peripheral edges 82 of support fingers 80 are bent back slightly relative to the forward projection of the support fingers 80. The bent peripheral edges 82 also enhance the comfort provided by the back support member and further reduce the amount of wear on a seat cushion that might otherwise be caused by the movement or adjustment of the back support 62 within the seatback.

Figure 3:
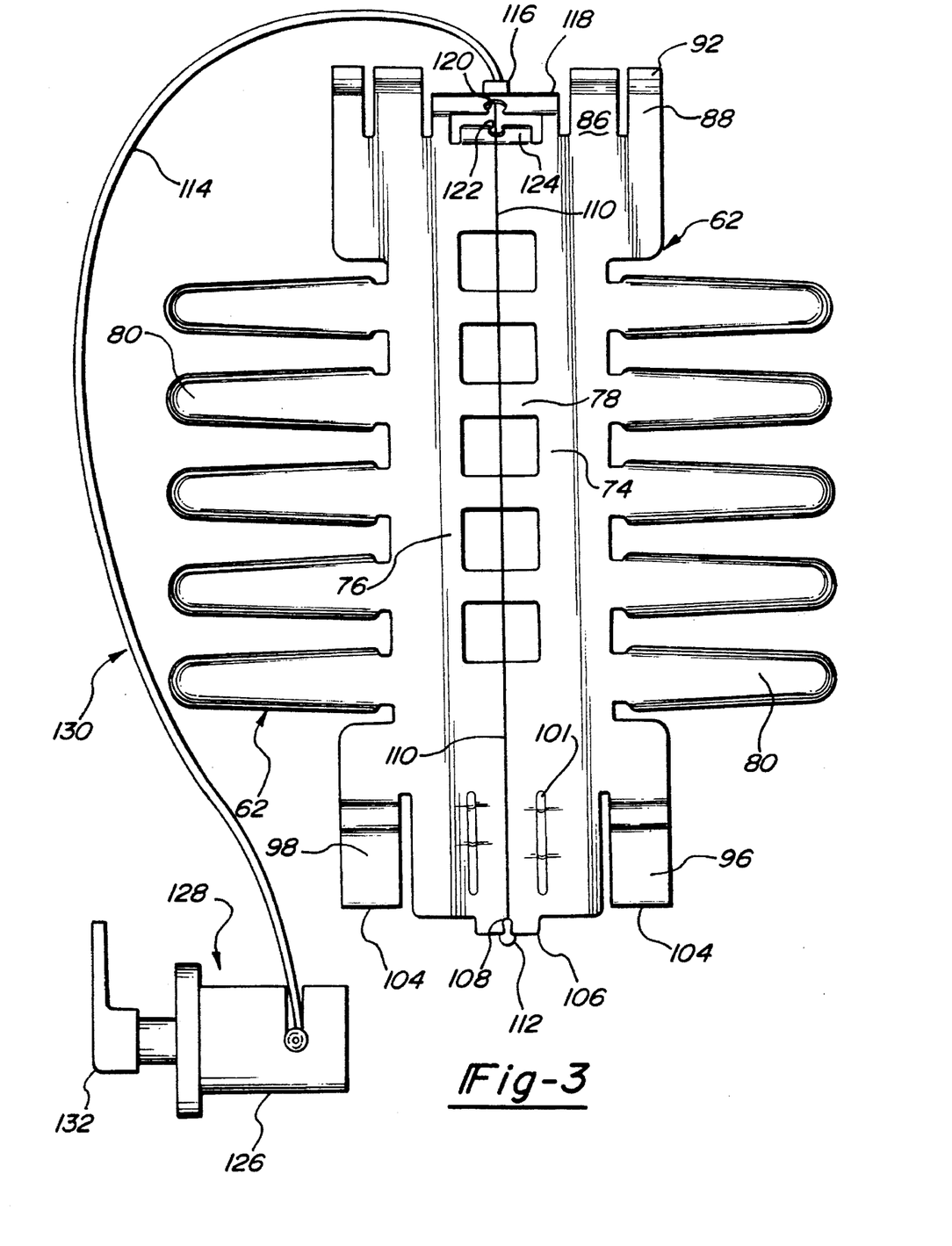
FIG. 3 is a rear plan view of the presently preferred embodiment of the inventive back support.
Figure 4:
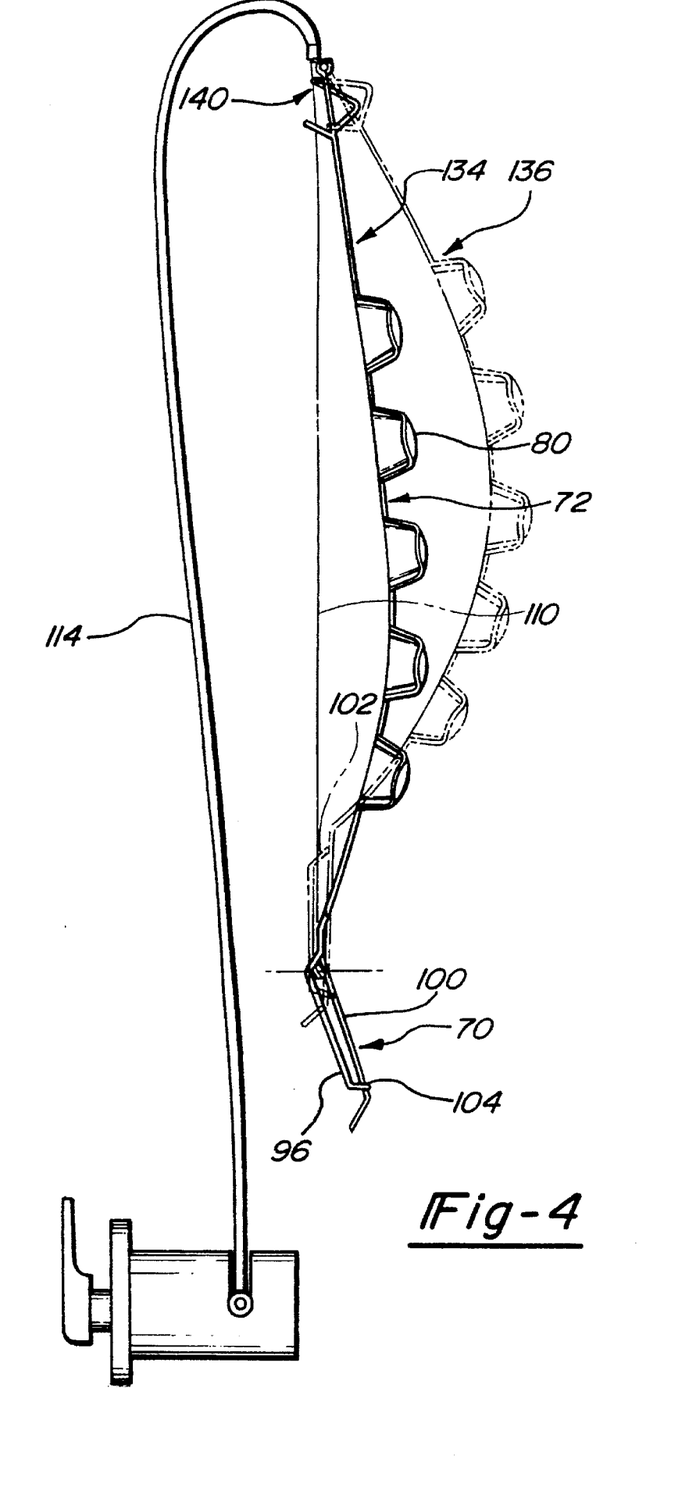
FIG. 4 is a side plan view illustrating how the preferred embodiment of the inventive back support arches outward to support a user's back.
Figure 5:
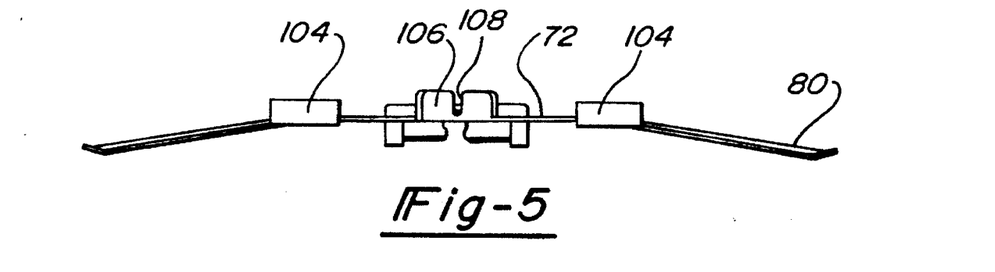
FIG. 5 is a bottom plan view of the inventive back support as it would appear in a relaxed state.

A first plate portion 84 is preferably provided near the first longitudinal end 66 of single-piece support member 62. First plate 84 as shown in FIGS. 2, 3 and 4 is at the top of the support member as it is positioned within a seatback. It is to be understood that the references within this description to the top or bottom of the support member are relative to the mounting of the illustrated preferred embodiment. First plate 84 includes clamping members 86 and 88 for mounting the first longitudinal end 66 of support member 62 on bar 64. Clamping members 86 and 88 provide an easy installation of the support member 62 because clamping members 86 and 88 effectively "snap on" bar 64 as the support member is moved generally upward against bar 64. The mounting provided by clamping members 86 and 88 enables efficient assembly requiring a minimum amount of tools and a minimum amount of parts. This further enhances one of the major advantages of the present invention; providing a lightweight back support system that provides enhanced manufacturing and assembling economies. Extension tabs 92 are angled and provided at the distal end of clamping members 86 and 88 to further facilitate assembly. As will be more fully explained below, cable guide 90 is provided near first longitudinal end 66.

A second plate portion 94 is preferably provided near the second longitudinal end 70 of the single-piece support member 62. The second plate 94 is preferably essentially flat for a portion of its length and then branches out, forming holding member 96 and holding member 98. Holding members 96 and 98 are preferably at each transverse end of the second plate 94 and effectively straddle holding plate 100. Bar 68 is received between holding members 96, 98 and holding plate 100. A polyeurothane sleeve (not illustrated specifically) is preferably provided around bar 68 to facilitate more frictionless movement along bar 68. Further, beads 101 are preferably provided on plate 100 to further facilitate a frictionless engagement between bar 68 and plate 100 and beads 101 add strength. Raised beads 101 effectively ride on bar 68 to provide less surface contact and, therefore, less friction.

The mounting of the single-piece support member 62 upon bars 64 and 68 is characterized by a movable and pivotal mounting near the second longitudinal end 70. Holding member 96 and 98 have first and second longitudinal ends 102 and 104, respectively. Ends 102 and 104 serve as stops or abutments for the longitudinal positioning of the second plate 94 relative to bar 68. As will be described in more detail below, the movement of an actuating means will cause holding plate 100 and holding members 96 and 98 to move pivotally and longitudinally (generally upward or downward according to the drawing) relative to bar 68. That is, the support member bottom end or second longitudinal end 70 pivots about bar 68 and moves in an upward direction (according to the drawing) When an actuating means or adjustment means causes the single-piece support member to bow outward.

Tab 106 is provided at the second longitudinal end 70 of single-piece support member 62. Tab 106 includes a notch or slot 108 that serves as a cable attachment. As best illustrated in FIG. 3, flexible cable 110 is inserted through the notch in tab 106 and held in a fixed position relative to tab 106 by the tension on cable 110 and by swage 112. Swage 112 is a conventional ball and shank type swage used for limiting the movement of a cable in a system such as that depicted in FIGS. 2 and 3. Cable housing 114 is provided along a portion of the length of flexible cable 110. In the embodiment illustrated in FIG. 3 a sleeve 116 is provided at one end of cable housing 114. Sleeve 116 bears against tab 118 which is defined upon the single-piece support member 62 near its first longitudinal end 66. Tab 118 has a notch 120 that serves as a cable guide in conjunction with the notch 122 on tab 124. The cable guide portion of the single-piece support member facilitates maintaining the position of flexible cable 110 relative to the seatback and flexible support member while concomitantly reducing the possibility that the cable will undesirably bear against or become entangled with any portion of the seatback or the flexible support member. That is, the cable guide provided by tab 118 and tab 124 facilitates proper positioning of the cable such that wear and tear on the back support system designed in accordance with this invention is reduced.

Cable housing 114 (in the embodiment of FIG. 3) extends from sleeve 116 to an opening in housing 126. Housing 126 is a portion of the shortening means 128. The shortening means is used to shorten the effective length of the flexible cable 110. The flexible cable 110, cable housing 114 and shortening means 128 together comprise the adjustment means or actuating means 130. The housing 126 and shortening means 128 are preferably disposed along an outer surface near a seat such that a user has convenient access to handle 132. Handle 132 is used to manipulate the shortening means 128 such that the effective length of flexible cable 110 is shortened or lengthened as desired.

Referring now to FIG. 4, the preferred embodiment of flexible support member 62 is shown in a first position 134. The first position 134 corresponds to the back support member being in an initial position or a relaxed state. Although the position illustrated in FIG. 4 is termed a relaxed state, it is to be understood that is provides some minimal amount of additional back support compared to a seat that would not have such a device within it. If a user manipulates handle 132 to wind the cable within housing 126 (as to be more fully described below) the second longitudinal end 70 of the flexible support member 62 is drawn upward (according to the drawing) toward the first longitudinal end 66 which remains fixed relative to bar 64 because of the attachment described above. Holding members 96, 98 and holding plate 100 pivot and move in an upward direction along bar 68. As illustrated in FIG. 4, the initial rest position includes the holding plate 100 and holding members 96 and 98 being in a slightly forward direction compared to a plane defined by the flexible cable 100. In the second position illustrated in FIG. 4 at 136 (in phantom) the holding plate 100 and holding members 96 and 98 are essentially parallel to the plane defined by flexible cable 110. Ends or stops 102 and 104 limit the amount of longitudinal movement of holding plate 100 and holding members 96 and 98 along bar 68.

Flexible support member 62 responds to forces imposed by a person's back that is sitting in the seat in the same manner as that described in relation to FIG. 9 below. It is the thin, lightweight, single-piece structure and the material used in the single stamping of the single-piece support member 62 combined with the attachments to bars 66 and 68 that enable the flexible support member to have a varying apex as that described in relation to FIG. 9 below. In the general manner described in relation to FIG. 9 below, the flexible support member 62 provides greatest comfort to a variety of individuals because of its ability to essentially conform to the posture and/or shape of the individual's back to provide the greatest amount of comfort and support.

As the second longitudinal end 70 of flexible support member 62 pivots and moves in a generally upward direction along bar 68, the clamping members 86 and 88 rotate about bar 66 such that a front portion on tab 118 moves in an upward arcuate direction (according to the drawing) as shown by the arrow 140 in FIG. 4.

When the effective length of cable 110 is shortened the second longitudinal end 70 of flexible support member 62 is drawn generally toward the first longitudinal end 66. If the effective length of the cable is increased or lengthened, then the second longitudinal end 70 moves in a direction away from the first longitudinal end 66. It is to be understood by one skilled in the art that the illustrated embodiment includes the second longitudinal end being positioned at the bottom of a seatback relative to a first longitudinal end and that those positions could be reversed or the illustrated embodiment could be modified accordingly in order to accommodate such need or situation.

FIG. 6 shows a second embodiment of the back support of this invention as it would be mounted on a seatback according to the second embodiment. Back support 16 includes horizontal support strips 20. Horizontal support strips 20 include center bends 22. Center bends 22 ensure that back support 16 bends properly and in particular that support 16 bows outwardly toward the individual and not inwardly when subtended longitudinally by tension member 18. Further, center bends 22 provide added comfort for a person's back because of their shape. Horizontal support strips 16 preferably include bent ends 23 that protect a seatback padding from damage. Horizontal support strips 20 are preferably spaced apart so that the portions of strips 20 proximate each side of center bends 22 fit within the intercostal spaces along a person's spine. The number of support strips 20 may vary depending on the design requirements for a particular embodiment.

Support strips 20 are interconnected by flexure pivots 24. Flexure pivots 24 provide a frictionless pivotable interconnection between support strips 20. In the disclosed embodiment, each flexure pivot 24 includes a pair of adjacent straps 25 that are generally J-shaped. The straight portion 27 of each strap 25 lies adjacent the curved portion 29 of the adjacent strap 25. See FIGS. 6 and 8. In this way, the back support 16 can be flexed or bowed outwardly without plastic deformation of any member and without friction; thereby producing a very flexible structure without sacrificing longitudinal strength.

Top bearing member 26 preferably forms the top end of back support 16 according to one embodiment. Top bearing member 26 includes connecting tab 28 for coupling tension member 18 to back support 16.

In one embodiment, back support 16 is connected to seatback 12 by mounting tabs 30 that are secured to support member 32 by connecting means 34. Support member 32 is attached to the seatback frame or could also be formed as an integral part of the seatback. Connecting means 34 can be any strong connecting means such as bolts, screws, rivets or spot welds, for example. The illustrated embodiment includes a nut and bolt connecting means 34.

Reaction surface 36 is attached to the frame of the seatback 12 or formed as an integral part of the seatback. Bearing member 26 bears against reaction surface 36 because of tension provided through tension member 18. Reaction surface 36 can be two vertical bars (as illustrated) or could be a single horizontal bar with sufficient width to bear against top bearing member 26. In one embodiment reaction surface 36 is a single horizontally disposed plate approximately 2 inches wide appropriately positioned to engage bearing member 26.

Bearing member 26 preferably includes vertex 38. Vertex 38 provides two angularly adjacent faces on bearing member 26, and thereby increases the rigidity of bearing member 26. Vertex 38 provides the advantage of allowing bearing member 26 to bear against and move along reaction surface 36 in a relatively frictionless manner.

Adjusting means 40 facilitates altering the effective length of tension member 18. In the disclosed embodiment, tension member 18 is wound around spool 42 in response to rotation of handle 44. In one embodiment, adjusting means 40 is mounted within a seat such that handle 44 is on the outside of a seatback. As should be appreciated, adjusting means 40 can be any means that changes the effective length of tension member 18 and preferably is lightweight. In one embodiment, adjusting means 40 is manually operated by rotating a handle 44. In another embodiment, adjusting means 40 is a electromechanical winding mechanism that allows a user to adjust the effective length of tension member 18 by conventional actuating means such as fingertip switches or buttons. The presently preferred adjusting means will be more fully described below.

An important advantage of the present invention is its ability to use a simple Bowden type cable 18. The overall construction allows this simple type of control to be used to reduce cost and weight. Other known supports require a rigid rod and more complex control mechanisms.

Figures 7, 8:
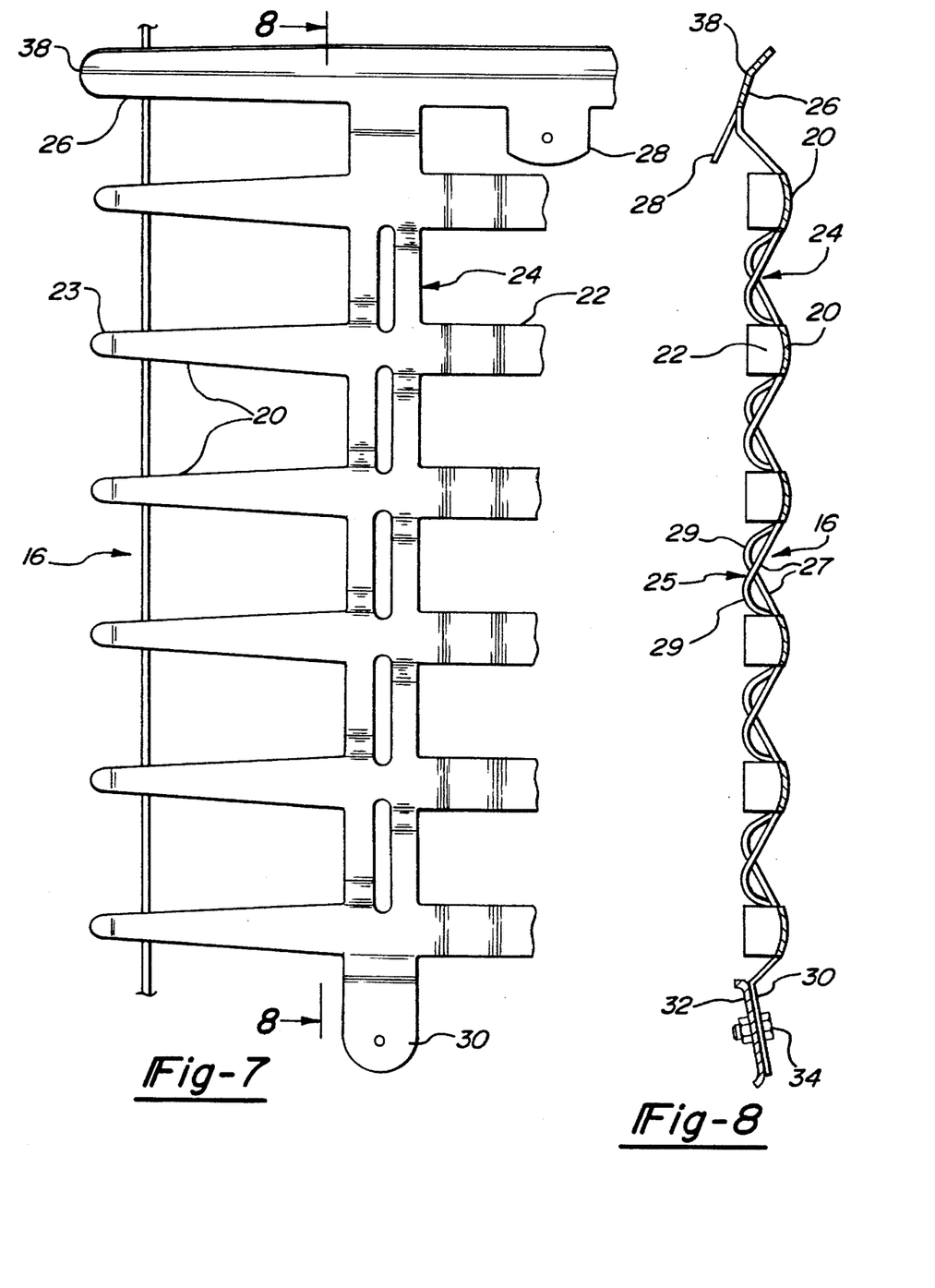
FIG. 7 is a front plan view of a portion of the inventive back support.
FIG. 8 is a side plan view of the inventive back support.

FIG. 7 is a front plan view of the left side of back support 16 as shown in FIG. 6. FIG. 7 illustrates how support strips 20, flexure pivots 24, top bearing member 26 and connecting tabs 30 can be integrally formed from a single piece of material in accordance with the present invention. It should be appreciated that the present construction is adapted to be formed in a punch press operation with the support 16 being formed by a press, from one piece of material, not several individual pieces connected together. It should be understood that the back support could be made of other materials, such as for example injection molded or thermoformed plastic.

FIG. 8 is a partial cross-sectional side plan view of the back support shown in FIG. 7 taken along the line indicated as 4—4. FIG. 8 highlights the shape of flexure pivots 24 as viewed from the side. The details of one embodiment of top bearing member 26 are illustrated to show the spacial relationship between the two legs of top bearing member 26 as formed by vertex 38. Back support 16 is shown in FIG. 8 in a relaxed state. A relaxed state corresponds to the position of back support 16 that provides minimal support to a person's back when appropriately sitting in a seat that incorporates back support 16. Tension member 18 would be appropriately connected to connecting tab 28. The position of back support 16 illustrated in FIG. 8 corresponds to the longest effective length of tension member 18.

Figure 9:
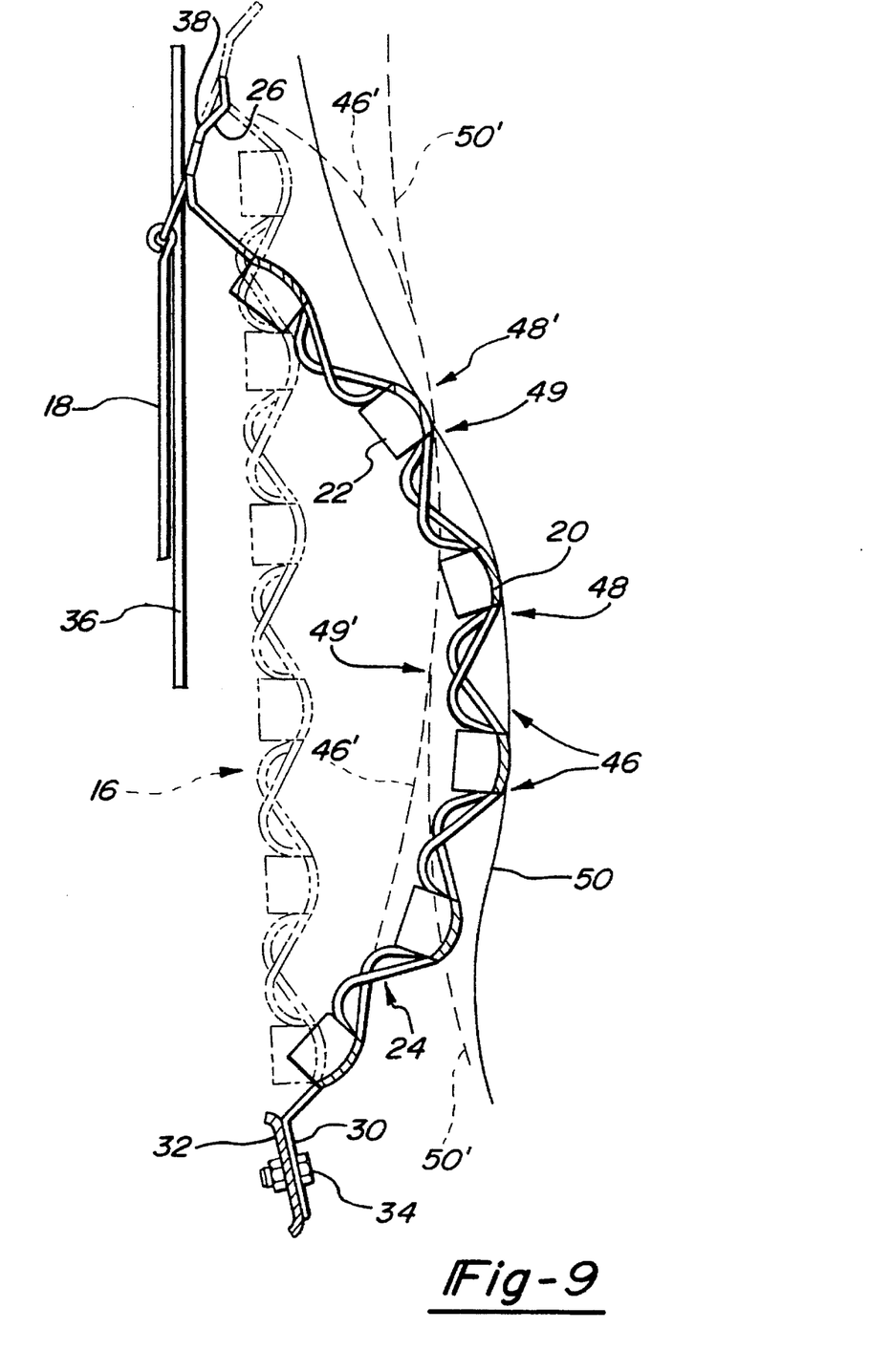
FIG. 9 is a diagramatic representation of the inventive back support illustrating the varying position of the apex formed in the back support.

Referring to FIG. 9, the inventive back support works generally as follows. The description of FIG. 9 is specifically directed to the embodiment of FIGS. 6–8 but the performance criteria set forth apply also to the preferred embodiment of FIGS. 2–5. Back support 16 is shown in phantom in the relaxed position illustrated in FIG. 9 as generally vertical. As the effective length of tension member 18 is shortened by adjusting means 40, back support 16 is subtended longitudinally forming an arch 46 thereon. The apex 48 of arch 46 would typically be located in the longitudinal center of back support 16. Back support 16 is sufficiently resilient to allow apex 48 to effectively travel along the longitudinal length of back support 16, thereby altering the position of apex 48 and, correspondingly, the shape and height of arch 46. This feature is illustrated in FIG. 9 as would be seen in a typical application from the side. The posterior lumbar portion of a person's back is represented schematically by line 50. Back support 16 is shown with arch 46 adjusted appropriately to support the back 50. The shape of back 50 and the distribution of a corresponding person's body weight imposes a relatively heavier load on back support 16 at the point indicated as 49. Simultaneously, a relatively lighter load is imposed at the point where the apex 48 is formed. Accordingly, back support 16 conforms to the shape of back 50 to provide maximum support and, therefore, comfort. The shape of back support 16 is therefore dictated by the shape of back 50 and the distribution of the corresponding person's body weight and/or their posture and position relative to the seatback and back support 16.

Assume that a different person sits on the seat containing back support 16. It is likely that the shape and posture of this second person is different from that of the first person. The second person's posterior lumbar side is represented by line 50' shown in phantom. The curvature of the spine of the person corresponding to line 50' and their posture relative to the seatback and the distribution of their body weight imposes a maximum load on back support 16 at the point indicated as 49'. Accordingly, the shape of back support 16 responsively conforms to the imposed load; forming arch 46' shown in phantom. Apex 48' exists at the point of relatively lighter load on back support 16. Therefore, back support 16 provides maximum comfort and support to back 50' because arch 46' and apex 48' effectively adjust to the load imposed by back 50'. A back support designed in accordance with this invention automatically provides variable support without further adjustment by the user. The design of back support 16 provides an arch 46 or 46' that responsively conforms to a back 50 or 50', respectively. Similarly, the longitudinal position of apex 48 or 48' varies according to the load imposed by back 50 or 50'.

Varying degrees of support and comfort may be obtained by adjusting the effective length of tension member 18 and correspondingly reducing or increasing the height of arch 46 or 46'. A shorter effective length of tension member 18 corresponds to an arch of greater height.

Back support 16 preferably is a single-piece unit capable of supporting a person's back and flexing appropriately to provide a variable apex 48 along the length of arch 46. In one embodiment back support 16 is formed of a low carbon, alloy-free, pretempered cold-rolled steel by a single stamping. One such steel is marketed by Inland Steel called Martinsite®.

The lengthening or shortening of the effective length of flexible cable 110 (from the preferred embodiment) in order to actuate or adjust the curvature of flexible support member 62 can be accomplished through a variety of means. First, the basic handle and spool illustrated in FIG. 6 could be used. Secondly, a linear actuator that includes a nut connected to one end of flexible cable 110 that moves along a lead screw to draw the flexible cable 110 into a housing in a generally conventional manner could be used. Third, an electromechanical shortening means could be employed that would include, for example, a motor for turning a lead screw relative to a nut that would facilitate drawing the flexible cable 110 into a housing of an otherwise conventional linear actuator.

Figures 10, 11:
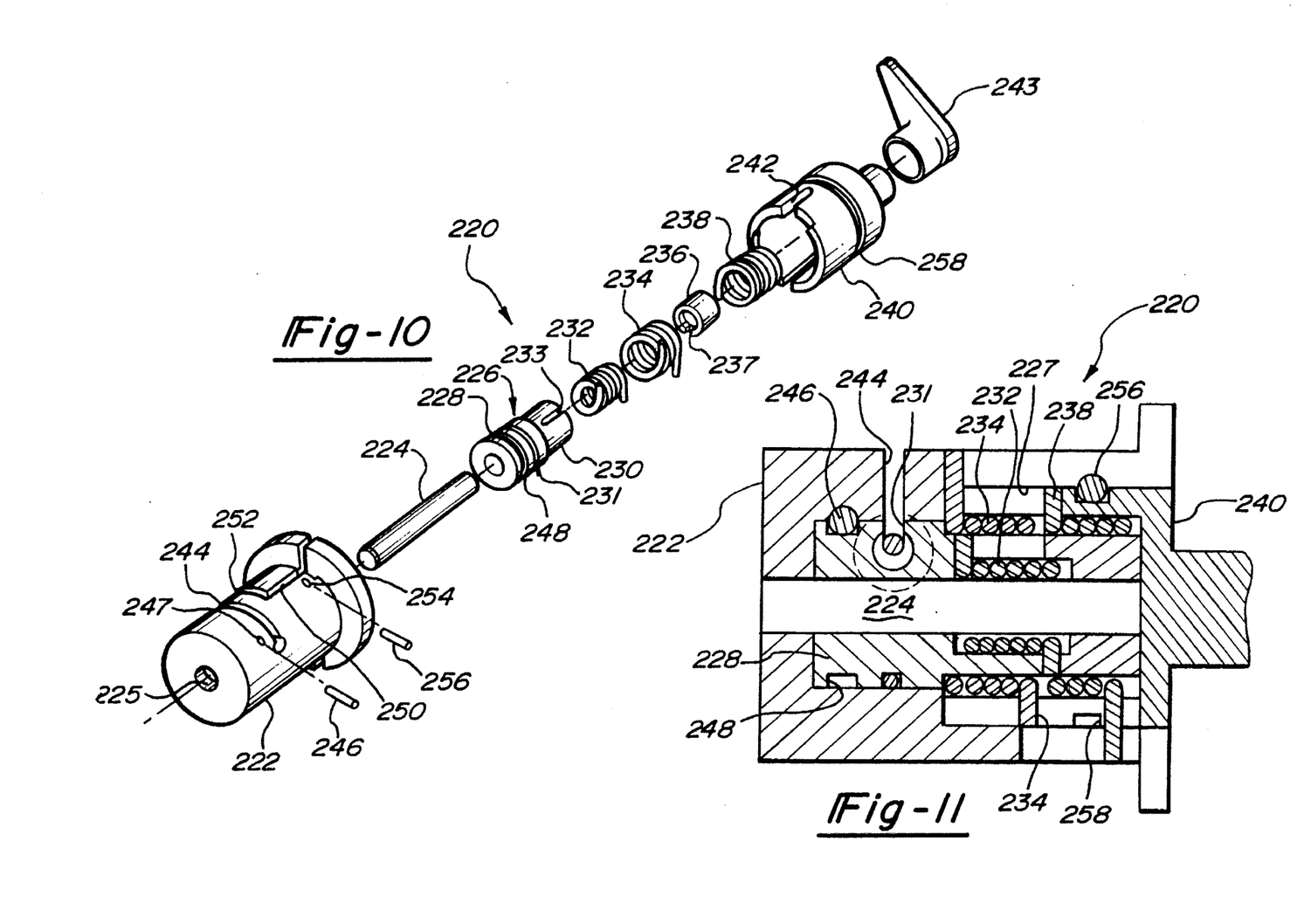
FIG. 10 is an exploded perspective view of the presently preferred embodiment of the subtending means used with the inventive back support.
FIG. 11 is a cross-sectional plan view of an assembled winding mechanism that is used as part of the subtending means.

However, Applicant has found it most useful to employ (and the preferred embodiment includes) a linear actuator or winding mechanism as that illustrated in FIGS. 10 and 11. FIGS. 10 and 11 are detailed diagrammatic representations of the shortening means 128 generally illustrated in FIG. 3.

Referring now to FIGS. 10 and 11, winding mechanism 220 (also referred to as the cable adjustment or shortening means 120) includes housing 222 that is mounted in a conventional manner on or near a seat that employs the inventive back support. Housing 222 corresponds to housing 126 of FIG. 3. Rod 224 is preferably pressed fitted within hole 225 in housing 222. Accordingly, bar 224 remains longitudinally and rotationally fixed within housing 222. Rod 224 preferably has a longitudinal axis that is coincident with a center axis through housing 222. As illustrated in FIG. 10, a central axis through each of the elements of FIG. 10 is preferably coincident.

Spool 226 is received over rod 224 and fits within a central bore 227 within housing 222. Spool 226 includes a portion 228 having a wider diameter than sleeve portion 230. Portion 228 on spool 226 is preferably configured to receive flexible cable 110 such that the cable is wrapped around the circumferential notch 231 on portion 228 of spool 226. In the preferred embodiment, flexible cable 110 is wrapped a maximum of 360 degrees around spool 226. In other words, one full rotation of spool 226 corresponds to moving the flexible support member 62 from a relaxed position to a fully or completely longitudinally subtended position providing the maximum support available from the support member 62.

Spring clutch 232 is received upon bar 224 and fits within the sleeve portion 230 of spool 226. One of the extending ends on spring clutch 232 nests within slot 233 on sleeve portion 230 of spool 236 such that spool 226 rotates in unison with spring clutch 232. Spring clutch 234 is received over sleeve portion 230 as can best be seen in FIG. 11. Spring clutch 234 is also referred to as the drive spring because it is biased in a direction that facilitates a user shortening the effective length of flexible cable 110 to thereby cause an increased curvature and greater outward bowing of the flexible support member 62.

Sleeve 236 is also received over bar 224 and abuts the end of sleeve portion 230 that is distal from portion 228. Sleeve 236 includes slot 237 that receives a projection on spring clutch 232 such that sleeve 236 rotates in unison with spool 226.

Spring clutch 238 is received over sleeve 236 as illustrated in FIG. 11. Spring clutch 238 is referred to herein as the reverse drive spring because it is biased in a direction that enables a user to increase the effective length of flexible cable 110 to thereby allow the flexible support member 62 to have a decreasing curvature or to be returned to the relaxed position as desired. Secondary housing 240 fits over and receives sleeve portion 230, spring clutch 232, spring clutch 234, sleeve 236 and spring clutch 238. Secondary housing 240 includes slots such as slot 242 for receiving the various projections from the spring clutches as appropriate. Secondary housing 240 is nested within housing 222 and rotates within the central bore 227.

Lever handle 243 is fixedly connected to secondary housing 240 such that rotation of lever handle 243 rotates the secondary housing 240 within housing 222. Rotation of secondary housing 240 causes spring clutch 234 or 238 to engage and rotate sleeve portion 230 or sleeve 236 depending on the direction that lever handle 243 is moved. For example, in the embodiment of FIG. 10, when lever handle 243 is rotated generally downward (according to the drawing) spring clutch 234 engages sleeve portion 230 of spool 226 such that the movement of the handle imparts a rotation to the spool 226. When spool 226 is rotated in this direction flexible cable 110 is wound about and received within the circumferential notch 231 such that the effective length of cable 110 is shortened and the flexible support member 62 bows outwardly.

Spring clutch 232 is provided within spool 226 and around bar 224 such that, when handle 243 is released by a user, spool 226 maintains the last position caused by the user's movement of handle 243. In other words, spring clutch 232 engages bar 224 such that spool 226 is prevented from rotational movement about bar 224 unless a force great enough to cause spring clutch 232 to slip about bar 224 is imparted by actuation of lever handle 243.

In a similar manner, rotation of lever handle 243 in a generally upward arcuate movement causes spring clutch 238 to engage sleeve 236 and rotate it in the same direction as the lever handle 243. When spring clutch 238 is rotating sleeve 236, spool 226 is rotated in the same direction because of the presence of spring clutch 232 received with the sleeve portion 230 and sleeve 236. Such movement increases the effective length of cable 110 because the cable is unwound from spool 226.

Slot 244 is provided in housing 222 to receive flexible cable 110 such that cable 110 can be wound about spool 226. Dowel 246 is received in hole 247 in housing 222 in order to maintain spool 226 in the appropriate axial position relative to central bore 227 and housing 222. Circumferential notch 248 is provided on spool 226 such that spool 226 can rotate within housing 222 and remain axially fixed by dowel 246. One skilled in the art will appreciate that dowel 246 is inserted after the entire assembly is completed as illustrated in FIG. 11.

Receiving slot 250 and adjacent limiting slot 252 are provided in housing 222 in order to receive the projecting end of the spring clutch 234 that is shown upward in FIG. 10. Limiting slot 252 is provided to allow spring clutch 234 to unwind slightly as the lever handle 243 is being rotated such that reverse drive spring 238 is engaging sleeve 236. A similar limiting slot is provided on another portion of housing 222 (not specifically illustrated) to allow spring clutch 238 to unwind slightly while drive spring 234 is engaging spool 26 in order to wind a portion of flexible cable 110 about the spool. The unwinding feature of the two spring clutches Just described facilitates maintaining lever handle 243 in a centered rest position. That is, when lever handle 243 is moved arcuately downward for example, then released by a user, the lever handle 243 is returned to a central rest position when spring clutch 248 returns to its rest state from its previously unwound position (i.e., moving lever handle 243 in a downward arcuate motion will cause spring clutch 238 to be unwound slightly according to the length of the limiting slot provided on housing 222). Similarly, when the lever handle is moved upward, spring clutch 234 unwinds slightly and when the handle is released by the user, the spring clutch inherently returns the lever to a central rest position. The limiting slots are provided on housing 222 in order to facilitate the centering feature of lever handle 243 and further to facilitate the ability to manipulate handle 243 in a forward or reverse direction without causing the flexible cable to be wound or unwound in an undesirable direction upon the lever handle's return to the central position.

Hole 254 is provided in housing 222 to receive dowel 256 which retains secondary housing 240 and, thereby, the remainder of the assembly illustrated in FIGS. 10 and 11 in proper axial position relative to housing 222. Dowel 256 is preferably received within an arcuate notch 258 defined on secondary housing 240. In the presently preferred embodiment, the arcuate notch 258 corresponds to less than one half of the outer circumference of secondary housing 240. In this manner, the amount of rotation of lever handle 243 is limited to a preselected amount. For example, in one preferred embodiment, arcuate slot 258 enables a user to rotate lever handle 243 approximately 30 degrees in one direction upon one stroke of the handle. After the 30 degree rotation, the handle can be returned to the central rest position and then rotated again another 30 degrees in the same direction if further shortening of the effective length of the flexible cable 110 is desired, for example.

The winding mechanism or adjustment means 220 disclosed herein and described in relation to the embodiment illustrated in FIGS. 10 and 11 has uses beyond the inventive back support system disclosed. For example, such a winding mechanism is useful in applications that otherwise include ratcheting, or incline bearing tools. Once such example is using winding mechanism 220 for tightening a cable used to maintain the proper position of the top of a net on a tennis court. The many and varied uses of the winding mechanism 220 disclosed herein will become apparent to one skilled in the art.

It is to be further appreciated that some applications of winding mechanism 220 will not require the sophistication needed to provide the infinite adjustability and reversing the features desired in the preferred embodiment of the back support system disclosed herein. Accordingly, another embodiment of winding mechanism 220 does not include spring clutches 234 and 238 and sleeve 235. In this embodiment, lever handle 243 directly engages spring clutch 232, which moves about rod 224 when being driven by movement of lever handle 243 and locks in the position that it is last moved into by the handle. In this embodiment, spool 226 can be wound in an unwinding or winding direction because lever handle 243 is adapted to engage either end of spring clutch 232, depending on the direction of rotation of the handle.

The preceding description is exemplary rather than limiting in nature. A preferred embodiment was disclosed to enable a skilled artisan to practice the invention. Modifications are possible without departing from the purview and spirit of the present invention, the scope of which is limited only by the following claims.

We claim:

1. A seat comprising:

a base member;

a seatback member attached to one end of said base member, said seatback member having first and second horizontally disposed bars, each having a longitudinal axis and a fixed position relative to a top of said seatback member;

a single-piece flexible support member having two longitudinal ends, a first longitudinal end having a clamping member rotatably attaching said first end to said first horizontally disposed bar and a second longitudinal end having a holding member pivotably and slidably attaching said second end to said second horizontally disposed bar such that said holding member pivots about and relative to said longitudinal axis of said second horizontally disposed bar; and means, attached to said support member proximate said longitudinal end, for longitudinally subtending said support member, whereby said support member arches outwardly to support a user's back.

2. The seat of claim 1, wherein said single-piece flexible support member comprises:

a central body portion;

a first plate portion disposed at one end of said central body portion, one end of said first plate portion distal from said central body portion defining said first longitudinal end of said support member;

a second plate portion disposed at a second end of said central body portion distal from said first plate portion, said second plate portion defining said second longitudinal end of said support member; and a plurality of support fingers projecting horizontally outward from said central body portion.

3. The seat of claim 2, wherein each said support finger has a folded perimeter and a rounded end distal from said central body member.

4. The seat of claim 3, wherein said support fingers project forward from a plane generally defined by said central body portion when said support member is in a relaxed position such that said rounded end on each said support finger is forward of said plane.

5. The seat of claim 2, wherein said central body portion comprises a lattice structure further comprising a pair of vertically disposed longitudinal strips interconnected by a plurality of horizontally disposed transverse strips.

6. The seat of claim 2, wherein said first plate portion includes said clamping member and wherein said clamping member comprises a pair of partially rounded clamping arms that extend away from said central body portion to engage said first horizontally disposed bar on said seatback member, whereby said first longitudinal end of said support member is rotatably attached to said first bar.

7. The seat of claim 2, wherein said second plate portion includes said holding member and said holding member comprises a pair of holding members and a holding plate disposed at opposing transverse ends on said second plate portion, said holding members and said holding plate straddling said second horizontally disposed bar on said seatback member, whereby said second longitudinal end of said support member is pivotally and slidably attached to said second bar.

8. The seat of claim 7, wherein said holding members further comprise a stop at first and second longitudinal ends of said holding members, respectively, whereby movement of said second longitudinal end of said support member relative to said second horizontally disposed bar is limited by said stops.

9. The seat of claim 2 wherein said support member comprises a single-stamped piece of low carbon, alloy-free, pretempered cold rolled steel.

10. The seat of claim 2, wherein said support member is formed from a single sheet of material.

11. The seat of claim 1, wherein said subtending means comprises a flexible cable attached to said support member proximate said support member second longitudinal end, and a means for shortening an effective length of said cable disposed adjacent said seat; whereby shortening said effective length of said cable longitudinally subtends said support member by drawing said support member second longitudinal end toward said support member first longitudinal end.

12. The seat of claim 11, wherein said shortening means comprises a spool and a means for rotating said spool, said cable being wrappingly received around a portion of said spool to thereby shorten said effective length of said cable.

13. The seat of claim 12, wherein said effective length of said cable is adjustable is infinitely small increments by rotating said spool.

14. The seat of claim 1, wherein said flexible support member bows outwardly defining a curved portion with an apex, said apex being automatically adjustable in the longitudinal direction depending upon the application of force to said curved portion.

15. A back support for use within a seatback, comprising:

a unitary flexible support member including a central body portion having a longitudinal axis and first and second longitudinal ends, and a plurality of support fingers extending outwardly from said central body portion in a direction generally perpendicular to said longitudinal axis of said central body portion;

said support fingers each have a folded perimeter and a rounded end distal from said central body portion and project generally forward from a plane generally defined by said central body portion when said support member is in a relaxed position such that said rounded end on each said support finger is forward of said plane;

said first longitudinal end having a clamping member adapted to be rotatably attached to a bar on a seatback wherein said back support is employed;

said second longitudinal end having a holding member adapted to slidably and pivotally couple said second end to a second portion of the seatback; and wherein said central body portion said clamping member and said holding member are integrally formed from a single piece of material.

16. A back support for use within a seatback, comprising:

a unitary flexible support member including a central body portion having a longitudinal axis and first and second longitudinal ends, and a plurality of support fingers extending outwardly from said central body portion in a direction generally perpendicular to said longitudinal axis of said central body portion;

said first longitudinal end having a pair of clamping members projecting away from said central body portion and having opposite clamping surfaces such that said clamping members are adapted to rotatably engage a bar on the seatback wherein said back support is employed;

said second longitudinal end having a holding member adapted to slidably and pivotally couple said second end to a second portion of the seatback;

wherein said central body portion, said clamping member and said holding member are integrally formed from a sidle piece of material.

17. A back support for use within a seatback, comprising:

a unitary flexible support member including a central body portion having a longitudinal axis and first and second longitudinal ends, and a plurality of support fingers extending outwardly from said central body portion in a direction generally perpendicular to said longitudinal is of said central body portion;

said first longitudinal end having a clamping member adapted to be rotatably attached to a bar on a seatback wherein said back support is employed;

said second longitudinal end having three holding members, a first said holding member lying in a first plane and at least a second said holding member lying in a second plane that is essentially parallel to said first plane, said first and second planes being spaced apart such that said three holding members are adapted to cooperatively engage a second portion of the seatback wherein said back support is employed such that said holding members may be pivotally and slidably moveable on the second seatback portion; and wherein said central body portion, said clamping member and said holding member are integrally formed from a single piece of material.

18. The back support of claim 17, wherein said holding members are essentially flat and one of said holding members has a raised bead that is adapted to facilitate said holding members sliding along the second seatback portion.

19. The back support of claim 17, wherein said holding members further comprise a stop at first and second longitudinal ends of said holding members, respectively, for limiting movement of said second longitudinal end of said support member relative to the second seatback portion.

20. A back support for use within a seatback, comprising:

a unitary flexible support member including a central body portion having a longitudinal axis and first and second longitudinal ends, and a plurality of support fingers extending outwardly from said central body portion in a direction generally perpendicular to said longitudinal axis of said central body portion;

said first longitudinal end having a clamping member adapted to be rotatably attached to a bar on a seatback wherein said back support is employed;

said second longitudinal end having a holding member adapted to slidably and pivotally couple said second end to a second portion of the seatback;

wherein said central body portion, said clamping member and said holding member are integrally formed from a single piece of material;

means for longitudinally subtending said support member attached to said support member proximate said second longitudinal end, whereby said support member arches outwardly to support a user's back and wherein said subtending means comprises a flexible cable attached to said support member, a spool, a bar partially disposed within a central bore defined in said spool, a clutch spring surrounding a portion of said bar and engaging said spool, said clutch spring being biased such that said spool and said clutch spring rotate in only one direction about said bar, and a lever handle for rotating said spool about said bar whereby said cable is wound around a portion of said spool to thereby shorten an effective length of said cable, whereby shortening said effective length of said cable longitudinally subtends said support member by drawing said support member second longitudinal end toward said support member first longitudinal end.

* * * * *

UNITED STATES PATENT AND TRADEMARK OFFICE
CERTIFICATE OF CORRECTION

PATENT NO. : 5,518,294
DATED : May 21, 1996
INVENTOR(S) : Ligon et al

It is certified that error appears in the above-indentified patent and that said Letters Patent is hereby corrected as shown below:

Column 12, line 63, please delete "sidle" and substitute therefor --single--.

Signed and Sealed this

Sixteenth Day of July, 1996

Attest:

BRUCE LEHMAN

Attesting Officer    Commissioner of Patents and Trademarks